United States Patent [19]

Blakeslee et al.

[11] Patent Number: 4,724,661
[45] Date of Patent: Feb. 16, 1988

[54] TWO PIECE CROP HARVESTING HEADER AND FLOTATION MECHANISM THEREFOR

[75] Inventors: Edward A. Blakeslee, New Holland; David D. Hedstrom, Stevens; Ernest A. Schoeneberger, New Holland, all of Pa.

[73] Assignee: New Holland Inc., New Holland, Pa.

[21] Appl. No.: 903,938

[22] Filed: Sep. 4, 1986

[51] Int. Cl.4 .......................................... A01D 67/00
[52] U.S. Cl. ........................................ 56/208; 56/15.8; 56/DIG. 1
[58] Field of Search .................... 56/208, 15.8, DIG. 1

[56] References Cited

U.S. PATENT DOCUMENTS

| Re. 30,056 | 7/1979 | Halls . | |
|---|---|---|---|
| 3,306,014 | 2/1967 | Halls et al. | 56/DIG. 1 |
| 3,324,639 | 6/1967 | Halls et al. | 56/DIG. 1 |
| 3,521,433 | 7/1970 | Wright et al. | 56/208 |
| 3,553,945 | 1/1971 | Cyr et al. | 56/DIG. 1 |
| 3,574,990 | 4/1971 | Calder | 56/208 |
| 3,577,715 | 5/1971 | Halls et al. | 56/208 |
| 3,699,754 | 10/1972 | Koch et al. | 56/DIG. 1 |
| 3,959,957 | 6/1976 | Halls | 56/DIG. 1 |
| 4,009,554 | 3/1977 | Adee | 56/1 |
| 4,137,696 | 2/1979 | Webb | 56/DIG. 1 |

*Primary Examiner*—Paul J. Hirsch
*Assistant Examiner*—Vincent Ciamacco
*Attorney, Agent, or Firm*—Larry W. Miller; Frank A. Seemar; Darrell F. Marquette

[57] ABSTRACT

A header flotation mechanism for a hay harvesting machine having a header is disclosed wherein a first flotation mechanism floatingly supports a first header section from the frame of the harvester and a second flotation mechanism floatingly suspends a second header section from the first header section. A pair of intermeshing conditioning rolls is mounted in the first header section, while a reel and a cutterbar are mounted in the second header section. The second header section is connected to the first header section by upward and lower links, the lower links having first and second stops to limit the amount of vertical movement of the second header section relative to the first header section. The header lift mechanism is operatively associated with the linkage mechanism interconnecting the frame of the harvester in the first header section and is operable to raise both header sections.

15 Claims, 4 Drawing Figures

TWO PIECE CROP HARVESTING HEADER AND FLOTATION MECHANISM THEREFOR

BACKGROUND OF THE INVENTION

The present invention relates generally to crop harvesting machines having a header housing crop harvesting components and, more particularly, to a header flotation mechanism for floatingly suspending the header from the frame of the harvester to permit the header to follow changes in the ground contours.

Crop harvesting headers house harvesting components, such as the cutterbar, reel and conditioning rolls, to sever standing standing crop from the ground and subject the standing crop to subsequent harvesting operation. It is desirable to floatingly suspend the header from the frame of the harvesting machine by a flotation mechanism that counterbalances a portion of the weight of the header so that the header may more easily follow changes in the contour of the ground. When harvesting forage crops, such as hay, it is desirable to operate the cutterbar in close proximity to the ground to collect as much of the standing crop as possible.

As noted in U.S. Pat. No. Re. 30,056, decreasing the weight of the header improves the floating characteristics thereof and permits the cutterbar to more easily follow the changes in ground contour. However, large amounts of flotational movement between the reel and the conditioning rolls affects the ability of the reel to feed severed crop material into the conditioning rolls. Accordingly, it would be desirable to provide a crop harvesting header for use particularly with a self-propelled harvesting machine, that would provide improved flotational characteristics of the header to permit the cutterbar to more easily follow changing ground contours, yet minimize the flotational movement between the reel and the conditioning rolls to improve feeding characteristics therebetween.

SUMMARY OF THE INVENTION

It is an object of this invention to overcome the aforementioned disadvantages of the prior art by providing a two piece crop harvesting header and a flotation mechanism therefor.

It is another object of this invention to provide a two piece header in which the conditioning rolls are mounted in a first header section and the reel and cutterbar are housed in the second header section.

It is still another object of this invention to provide a flotation mechanism for floatingly suspending a first header section from the frame of the crop harvesting machine and also floatingly suspending a second header section from the first header section.

It is a feature of this invention that the flotational characteristics of the header cutterbar are improved.

It is an advantage of this invention that the cutterbar can more effectively follow changes in ground contour.

It is another advantage of this invention that the flotational movement between the reel and conditioning rolls is minimized.

It is yet another object of this invention to provide a linkage mechanism pivotally interconnecting the first and second header sections and providing stops to restrict the amount of vertical movement of the second header section relative to the first header section.

It is another feature of this invention that a header lift mechanism operably associated with the linkage mechanism interconnecting the first header section and the harvester frame is operable to lift both the first and second header sections.

It is still another advantage of this invention that by limiting the amount of downward vertical movement of the second header section relative to the first header section, the header lift mechanism can raise both header sections into a transport position.

It is a further object of this invention to provide a two-stage header flotation mechanism that permits the header cutterbar mounted in a second header section to floatingly follow minor changes in ground contour without affecting movement of the first header section floatingly suspended from the harvester frame.

It is still a further object of this invention to provide a two stage header flotation mechanism to permit the header cutterbar to follow major changes in ground contour by use of a combination of flotational movements between the first and second header sections and between the first header section and the harvester frame.

It is still another feature of this invention that the lower links interconnecting the harvester frame in the first header section are connected to a common pivot axis with the lower links interconnecting the first header section and the second header section.

It is yet a further object of this invention to provide a two piece crop harvesting header and flotational mechanism therefor which is durable in construction, inexpensive of manufacture, carefree of maintenance, facile in assemblage and simple and effective in use.

These and other objects, features and advantages are accomplished according to the instant invention by providing a header flotation mechanism for a hay harvesting machine having a header housing a cutterbar, a reel and a pair of intermeshing conditioning rolls wherein a first flotation mechanism floatingly supports a first header section having the conditioning rolls mounted therein from the frame of the harvester and a second flotation mechanism floatingly suspends a second header section having the reel and cutterbar mounted therein from the first header section. The second header section is connected to the first header section by upper and lower links, the lower links having first and second stops to limit the amount of vertical movement of the second header section relative to the first header section. The header lift mechanism is operatively associated with the linkage mechanism interconnecting the frame of the harvester in the first header section and is operable to raise both header sections.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
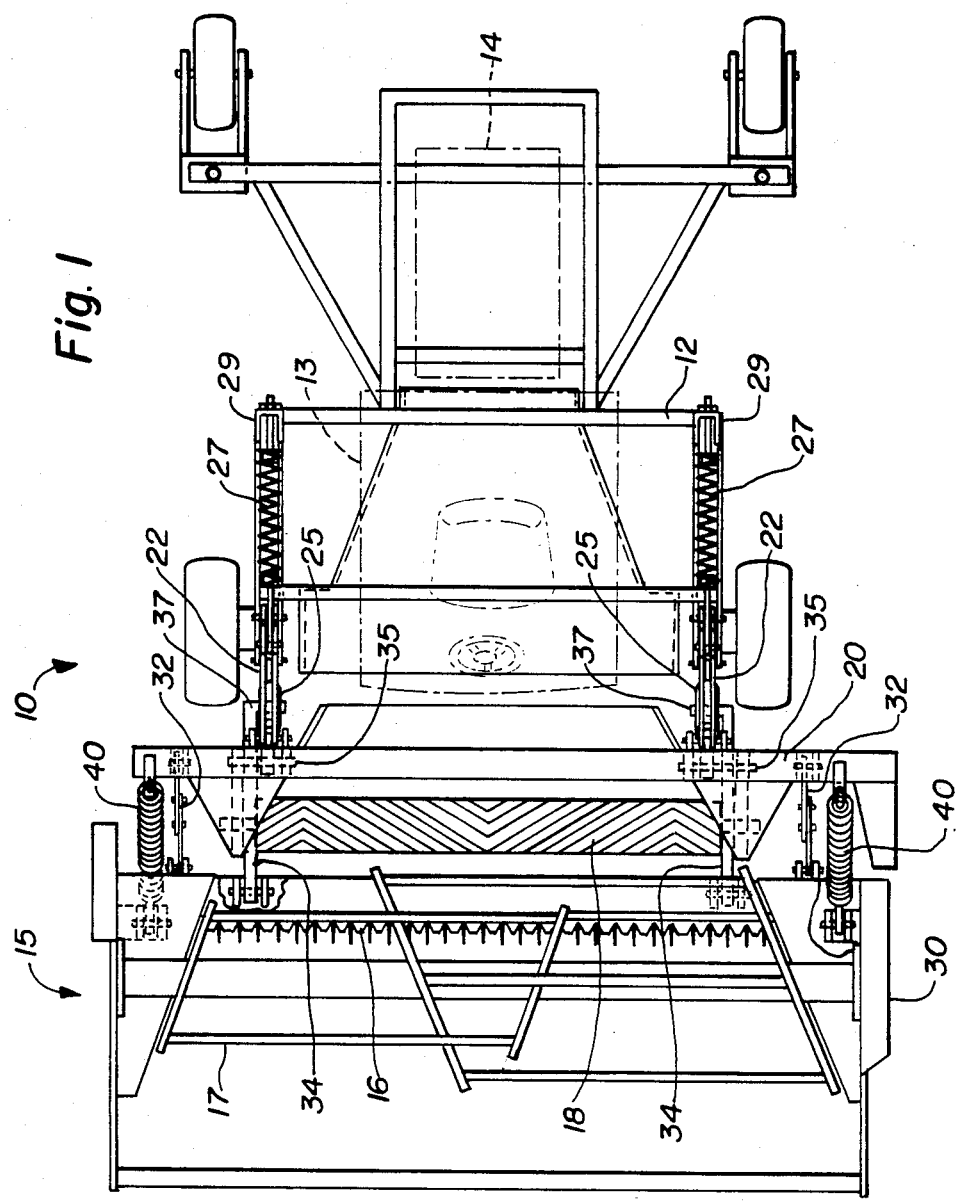
FIG. 1 is a top plan view of a crop harvesting header incorporating the principles of the instant invention and being mounted to a self-propelled crop harvesting frame, the cab and engine components being shown in phantom.

Referring now to the drawings, and particularly, to FIG. 1, a top plan view of the crop harvesting header mounted on a self-propelled hay harvesting machine, commonly referred to as a windrower or swather, can be seen. Any left and right references are used as a matter of convenience and are determined by standing at the rear of the machine, facing the forward end, the direction of travel. Although the principles of the instant invention are not limited to use on a self-propelled machine, the use of the two piece header as mounted on a self-propelled machine has been chosen as the preferred embodiment.

Figure 2:
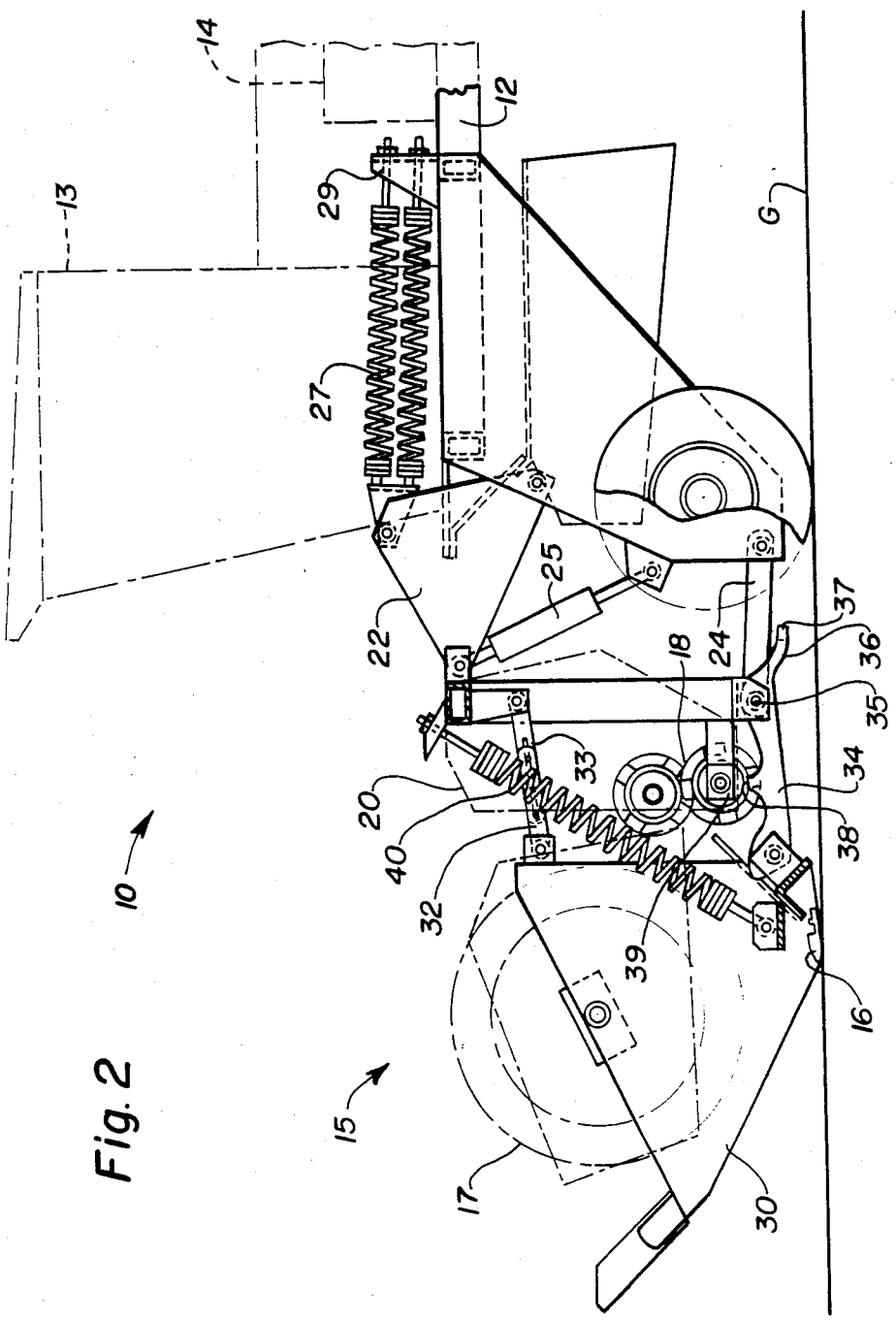
FIG. 2 is a left side elevational view of the crop harvesting header seen in FIG. 1 with portions of the harvester frame being broken away, the super structure of the harvester being shown in phantom.

Referring now to FIGS. 1 and 2, the windrower 10 is provided with a wheeled frame 12 supporting above the surface of the ground G an operator's cab 13 and an engine 14 providing the source of operating power which is transferred to the header 15 through a conventional drive mechanism not shown in the drawings. The crop harvesting header 15 houses conventional crop harvesting components, such as a cutterbar 16 operable adjacent the surface of the ground G to sever standing crop material therefrom, a reel 17 operable to convey severed crop material rearwardly, and a pair of intermeshing conditioning rolls 18 mounted rearwardly of the reel 17 to receive severed crop material therefrom for passage between the rolls 18 to permit a conditioning thereof.

The header 15 is divided into a first header section 20 and a second header section 30. The first header section 20 rotatably mounts the intermeshing conditioning rolls 18 and is pivotally connected to the frame 12 of the windrower 10 by a first pair of upper links 22 and a first pair of lower links 24. A header lift mechanism 25 interconnects the frame 12 and the upper links 22 to affect a raising of the first header section 20 relative to the frame 12. The upper links 22 are in the form of a bell crank onto which is connected a set of flotation springs 27 to provide a counterbalancing of the header weight formed by the upper links 22. These first flotation springs 27 are anchored on the frame 12 by the anchor 29 and, as is noted in greater detail below, provide a flotational operation for the entire header 15.

The second header section 30 houses the cutterbar 16 and the reel 17 and is pivotally connected to the first header section 20 by a second pair of upper links 32 and a second pair of lower links 34. The second upper links 32 are adjustable in length by means of a slot mechanism 33 to permit a controlling of the attitude of the second header section 30 relative to the first header section 20. The second set of lower links 34 are mounted on a pivot pin 35 on which the first set of lower links 24 is also pivotally mounted. The second lower links 34 are provided with a pair of stops 36,38 to limit the amount of vertical movement of the second header section 30 relative to the first header section 20. The first stop 36 is in the form of a tab 37 extending underneath the first lower links 24 to limit the amount of rotational movement of the second lower links 34 about the pivot pin 35 relative to the first lower links 24, which, in turn, restricts the downward movement of the second header section 30 relative to the first header section 20. The second stop 38 is in the form of a upwardly projecting member engageable with an abutment 39 formed as part of the first header section 20, thereby restricting the amount of upward movement of the second header section 30 relative to the first header section 20.

Accordingly, it can be seen that the second header section 30 is permitted to move vertically relative to the first header section 20 to a limited degree before engaging the first header section 20. When the second header section 30 has moved its maximum limit in either vertical direction relative to the first header section 20, the first flotational springs 27 permit the entire header 15 to be vertically moved relative to the frame 12, the first flotational springs 27 counterbalancing a portion of the weight of the entire header 15. A second set of counterbalancing flotation springs 40 interconnect the first header section 20 and the second header section 30 to facilitate a flotational movement of the second header section 30 relative to the first header section 20. It should be noted, however, that the downward movement of the first header section 20 is limited by the bottoming out of the lift cylinders 25. Once the lift cylinder 25 has been fully collapsed, the first header section 20 cannot move any lower.

Figure 3:
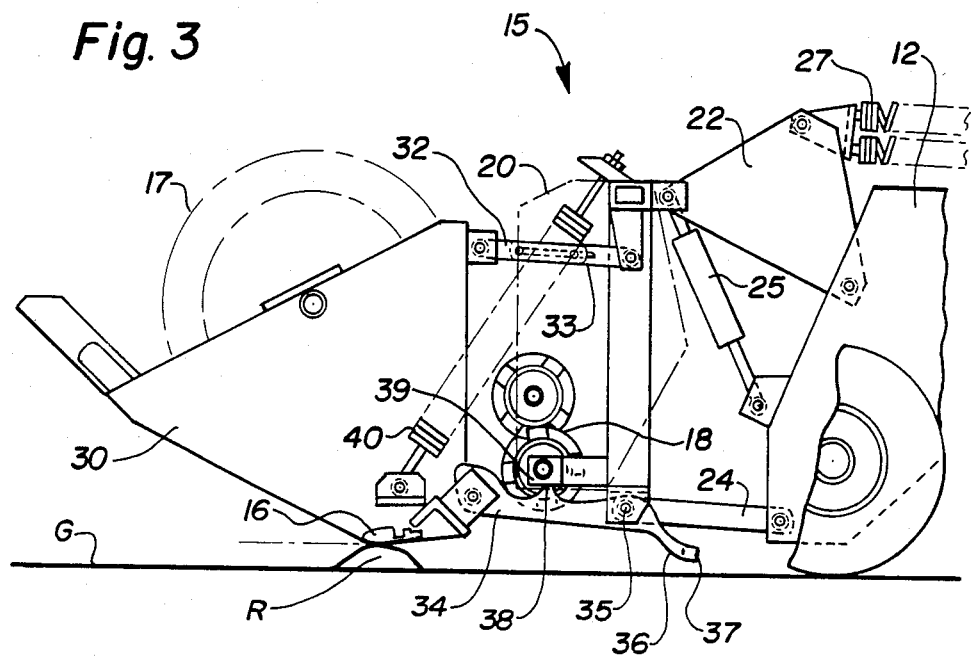
FIG. 3 is a partial side elevational view corresponding to FIG. 2 depicting a flotational movement of the second header section over a ground obstruction that will affect a simultaneous upward movement of both the first and second header sections.
Figure 4:
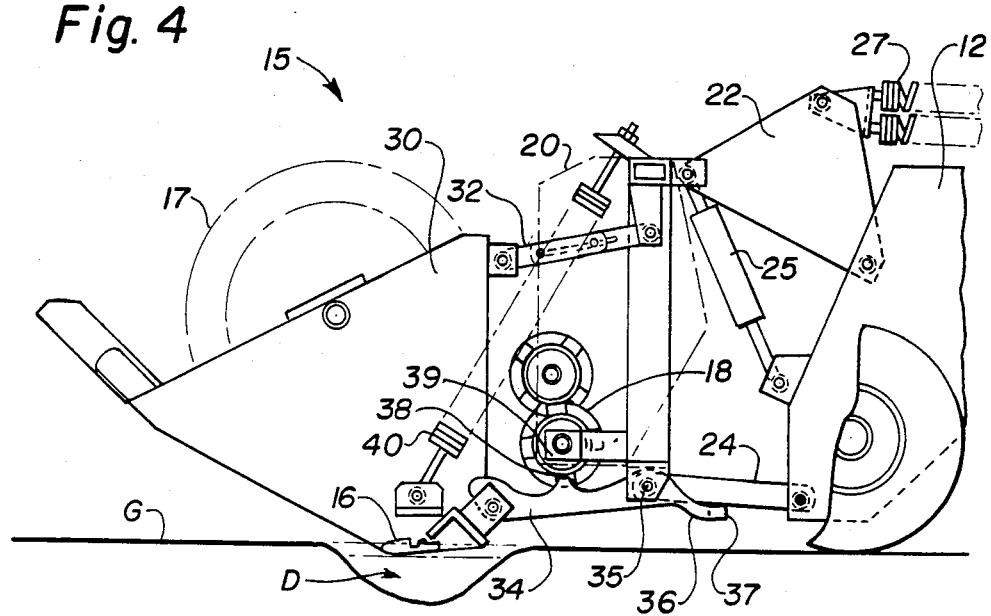
FIG. 4 is a partial side elevational view similar to FIG. 3 but showing a depression in the ground surface of a nature that would permit the full extent of the downward vertical movement of the second header section relative to the first header section.

Referring now to FIGS. 3 and 4, the operation of the two stage header flotation mechanism can best be seen. In FIG. 3, the second header section 30 has risen over an obstruction R on the ground surface G and floated upwardly with the help of the flotation springs 40 relative to the first header section 20 until the second stop 38 on the lower links 34 have engaged the corresponding abutments 39 on the first header section 20. At this point, the second header section 30 can no longer move upwardly relative to the first header section 20. Should any further upward vertical movement of the header 15 be required, the counterbalancing of the first header flotation springs 27 will assist in the upward movement of the entire header 15, including both the first and second header sections 20,30, relative to the frame 12 of the windrower 10.

Referring now to FIG. 4, the second header section 30 is shown encountering a depression D in the surface of the ground G such that the second header section 30 has moved downwardly relative to the first header section 20 to its maximum extent wherein the first header stop on the second lower links 34 have engaged the first lower links 24, thereby preventing any further downward movement of the second header section 30 relative to the first header section 20. Any further downward movement of the header 15 and, consequently, the second header section 30, as a result of the pivotal movement of the first set of upper and lower links 22,24 suspending the first header section 20 from the frame 12 of the windrower 10, will be as a result of the pivotal movement of the first set of upper and lower links 22,24 interconnecting the first header section 20 and the frame 12, excepting, however, that the downward movement of the first header section 30 is limited to the position corresponding to a fully retracted lift cylinder 25 which serves as a downward header flotation stop. Subsequent upward movement of the header 15 would follow the sequence described above relative to FIG. 3.

An operation of the header lift mechanism 25 will affect a pivoting of a first set of upper and lower links 22,24 to raise the first header section 20 relative to the frame 12. After a sufficient upward movement of the first header section 20 relative to the second header section 30, as affected by the header lift mechanism 25, the first stop 36 will engage the first lower links 24 and prevent any further relative movement between the first and second header sections 20,30 and, thereby, permit the header lift mechanism 25 to lift the entire header 15.

With the header 15 constructed as described above, the cutterbar 16 is mounted in the second header section 30 which is floatingly suspended from the first header section 20 and, thereby minimizes the mass floatingly suspended with the cutterbar 16. The net result is that the cutterbar 16 can more easily follow minor changes in ground contour. Major changes in ground contour can be accomodated through a two stage flotation mechanism in which the first stage permits the second header section 30 to float relative to the first header section 20 as assisted by the second flotation springs 40 followed by any possible simultaneous movement of both the first and second header sections 20,30 as assisted by the first flotation springs 27.

It is will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly, as well as in the specific form shown.

Having thus described the invention, what is claimed is:

1. In a harvesting machine having a wheeled frame; a header forwardly suspended from said frame for generally vertical movement relative thereto, said header being operable to engage crop material on the ground and initiate a crop harvesting action with harvesting apparatus housed in said header; and resilient means interconnecting said header and said frame to counterbalance a portion of the weight of said header to permit a flotational movment of said header to follow ground undulations, the improvement comprising:
 a first header section movably suspended from said frame for generally vertical movement relative thereto;
 a first resilient means interconnecting said first header section and said frame for floatingly supporting said first header section;
 a second header section movably suspended from said first header section for generally vertical movement relative thereto; and
 a second resilient means interconnecting said first and second header sections for floatingly supporting said second header section from said first header section and permitting a generally vertical movement of said second header section independently of said first header section.

2. The harvesting machine of claim 1 wherein said first header section houses a portion of said harvesting apparatus, said second header section having the remaining said harvesting apparatus.

3. The harvesting machine of claim 2 wherein said first header section is connected to said frame by a first set of upper and lower links, said second header section being connected to said first header section by a second set of upper and lower links, said second lower links having limit means associated therewith to restrict the amount of vertical movement of said second header section relative to said first header section.

4. The harvesting machine of claim 3 further comprising a header lift mechanism operatively associated with said first set of links to effect a selective raising of said first header section relative to said frame, said limit means permitting a raising of said second header section with the selective raising of said first header section by said header lift mechanism.

5. The harvesting machine claim 4 wherein said limit means comprises a first header stop engageable with said first lower links and a second header stop engageable with an abutment on said first header section.

6. The harvesting machine of claim 5 wherein said first and second lower links are connected to a common pivot pin, said second lower links being pivotable relative to said first lower links.

7. The harvesting machine of claim 6 wherein said first header stop comprises a tab positioned beneath said first lower links and engageable therewith to restrict the amount of downward movement of said second header section relative to said first header section.

8. The harvesting machine of claim 7 wherein said second header stop is engageable with said abutment to restrict the amount of upward movement of said second header section relative to said first header section.

9. The harvesting machine of claim 8 wherein said first header section houses a pair of intermeshing conditioning rolls to condition crop material passing therebetween, said second header section housing a cutterbar for severing standing crop material from the ground and a conveying mechanism for transferring severed crop material from said cutterbar to said conditioning rolls.

10. In a crop harvesting machine having a wheeled frame and a crop harvesting header forwardly suspended from said frame for generally vertical movement relative thereto, said header being operable to engage crop material on the ground and initiate a crop harvesting action with harvesting apparatus mounted in said header, said header being floatingly supported from said frame by a header flotation mechanism operable to counterbalance a portion of the weight of said header to permit said header to more easily follow changes in ground contour, an improved header comprising:
 a first header section mounting a portion of said harvesting apparatus and being pivotally connected to said frame by a first linkage to permit vertical movement of said first header section relative to said frame;
 a second header section mounting the remaining portion of said harvesting apparatus and being pivotally supported from said first header section by a second linkage to permit a generally vertical movement of said second header section relative to said first header section within a first range of movement, movement outside of said first range of movement being accomplished in conjunction with the generally vertical movement of said first header section;
 a first resilient means interconnecting said first header section and said frame for floatingly supporting said first header section; and a second resilient means interconnecting said first header section and said second header section for floatingly supporting said second header section relative to said first header section.

11. The harvesting machine of claim 1 wherein said harvesting apparatus includes a conditioning mechanism rotatably mounted in said first header section, a cutterbar for severing standing crop material from the ground and being mounted in said second header section, and a conveying mechanism mounted in said second header section and being operable to convey severed crop material from said cutterbar to said conditioning mechanism.

12. The harvesting machine of claim 11 wherein said first header section is connected to said frame by a first set of upper and lower links, said second header section being connected to said first header section by a second set of upper and lower links, said second lower links having limit means associated therewith to restrict the amount of vertical movement of said second header section relative to said first header section.

13. The harvesting machine of claim 12 wherein said limit means comprises a first header stop engageable with said first lower links to limit the rotational movement of the second lower links relative to the first lower links and a second header stop engageable with an abutment on said first header section to limit the amount of upward vertical movement of said second header section relative to said first header section.

14. The harvesting machine of claim 13 wherein said first and second lower links are connected to a common pivot pin, said first header stop being a tab positioned beneath said first lower link to limit the amount of downward movement of said second lower links relative to said first lower links.

15. The harvesting machine of claim 14 wherein said conditioning mechanism comprises a pair of intermeshing conditioning rolls rotatably mounted in said first header section and said conveying mechanism comprises a reel rotatably mounted in said second header section to convey severed crop material from said second header section to the conditioning rolls.

* * * * *